(12) United States Patent (10) Patent No.: US 7,748,029 B2
Ross (45) Date of Patent: *Jun. 29, 2010

(54) AUTHENTICATION QUERY STRATEGIZER AND RESULTS COMPILER

(75) Inventor: David Justin Ross, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 12/028,718

(22) Filed: Feb. 8, 2008

(65) Prior Publication Data

US 2008/0127305 A1    May 29, 2008

Related U.S. Application Data

(63) Continuation of application No. 10/449,568, filed on May 29, 2003, now Pat. No. 7,343,623.

(60) Provisional application No. 60/384,557, filed on May 29, 2002.

(51) Int. Cl.
*H04L 9/32* (2006.01)
*G06F 7/04* (2006.01)
*G06F 21/00* (2006.01)

(52) U.S. Cl. ............................. 726/6; 726/18
(58) Field of Classification Search ................... None
See application file for complete search history.

(56) References Cited

U.S. PATENT DOCUMENTS

| | | | |
|---|---|---|---|
| 4,890,323 A | 12/1989 | Beker et al. |
| 5,259,025 A | 11/1993 | Monroe et al. |
| 5,265,159 A | 11/1993 | Kung |
| 5,375,244 A | 12/1994 | McNair |
| 5,436,970 A | 7/1995 | Ray et al. |
| 5,613,004 A | 3/1997 | Cooperman et al. |
| 5,687,236 A | 11/1997 | Moskowitz et al. |
| 5,742,685 A | 4/1998 | Berson et al. |
| 5,774,551 A | 6/1998 | Wu et al. |
| 5,832,497 A | 11/1998 | Taylor |
| 5,838,814 A | 11/1998 | Moore |
| 5,841,886 A | 11/1998 | Rhoads |

(Continued)

FOREIGN PATENT DOCUMENTS

WO    WO9922330    6/1999

(Continued)

OTHER PUBLICATIONS

International Search Report; WIPO; Aug. 3, 2003.

(Continued)

*Primary Examiner*—Christopher A Revak
(74) *Attorney, Agent, or Firm*—Stolowitz Ford Cowger LLP

(57) ABSTRACT

Embodiments of the present invention encompass systems and methods for use in identity authentication. One illustrative application is in the context of authenticating the identity of a subject by verifying items of identifying information stored by, or accessible through, a plurality of data sources. In particular, a multi-item query can be presented to multiple data sources and the results of the query can be combined into an overall composite result that can be used to authenticate the subject's identity.

5 Claims, 11 Drawing Sheets

U.S. PATENT DOCUMENTS

| | | | |
|---|---|---|---|
| 5,841,888 | A | 11/1998 | Setlak |
| 5,844,817 | A | 12/1998 | Lobley et al. |
| 5,850,442 | A | 12/1998 | Muftic |
| 5,870,499 | A | 2/1999 | Bender et al. |
| 5,870,723 | A | 2/1999 | Pare, Jr. et al. |
| 5,872,848 | A | 2/1999 | Romney et al. |
| 5,883,810 | A | 3/1999 | Franklin et al. |
| 5,884,270 | A | 3/1999 | Walker et al. |
| 5,893,090 | A | 4/1999 | Friedman et al. |
| 5,910,988 | A | 6/1999 | Ballard |
| 5,940,507 | A | 8/1999 | Cane et al. |
| 5,973,731 | A | 10/1999 | Schwab |
| 5,987,440 | A | 11/1999 | O'Neil et al. |
| 5,991,408 | A | 11/1999 | Pearson et al. |
| 6,014,650 | A | 1/2000 | Zampese |
| 6,026,166 | A | 2/2000 | LeBourgeois |
| 6,026,491 | A | 2/2000 | Hiles |
| 6,039,248 | A | 3/2000 | Park et al. |
| 6,073,242 | A | 6/2000 | Hardy et al. |
| 6,085,322 | A | 7/2000 | Romney et al. |
| 6,111,954 | A | 8/2000 | Rhoads |
| 6,118,872 | A | 9/2000 | Kashima et al. |
| 6,122,403 | A | 9/2000 | Rhoads |
| 6,125,349 | A | 9/2000 | Maher |
| 6,175,923 | B1 | 1/2001 | Bailey |
| 6,202,151 | B1 | 3/2001 | Musgrave et al. |
| 6,230,148 | B1 | 5/2001 | Pare, Jr. et al. |
| 6,263,447 | B1 | 7/2001 | French et al. |
| 6,282,658 | B2 | 8/2001 | French et al. |
| 6,363,376 | B1 | 3/2002 | Wiens et al. |
| 6,363,485 | B1 | 3/2002 | Adams et al. |
| 6,385,620 | B1 | 5/2002 | Kurzius et al. |
| 6,496,936 | B1 | 12/2002 | French et al. |
| 6,532,459 | B1 | 3/2003 | Berson |
| 6,618,806 | B1 | 9/2003 | Brown et al. |
| 6,643,648 | B1 | 11/2003 | Ross et al. |
| 6,714,944 | B1 | 3/2004 | Shapiro et al. |
| 6,836,845 | B1 | 12/2004 | Lennie et al. |
| 6,845,453 | B2 | 1/2005 | Scheidt et al. |
| 6,904,407 | B2 | 6/2005 | Ritzel |
| 6,959,394 | B1 | 10/2005 | Brickell et al. |
| 7,039,951 | B1 | 5/2006 | Chaudhari et al. |
| 7,086,085 | B1 | 8/2006 | Brown et al. |
| 7,131,009 | B2 | 10/2006 | Scheidt et al. |
| 7,318,048 | B1 | 1/2008 | King |
| 7,343,623 | B2 * | 3/2008 | Ross ............... 726/6 |
| 2002/0091945 | A1 | 7/2002 | Ross |
| 2003/0037248 | A1 | 2/2003 | Launchbury et al. |
| 2003/0105762 | A1 | 6/2003 | McCaffrey et al. |
| 2004/0064454 | A1 | 4/2004 | Ross et al. |
| 2004/0039917 | A1 | 7/2004 | Ross |
| 2004/0139098 | A1 | 7/2004 | Margolus et al. |
| 2005/0187873 | A1 | 8/2005 | Labrou et al. |
| 2005/0238207 | A1 * | 10/2005 | Tavares ............ 382/115 |

FOREIGN PATENT DOCUMENTS

| | | |
|---|---|---|
| WO | 031032215 | 12/2003 |
| WO | WO 03/103215 A1 * | 12/2003 |

OTHER PUBLICATIONS

PressPass, "Microsoft's Bill Gates Previews New 'Hailstorm' Technologies to Usher in New Era of More Consistent Personalized and User-Centric Experiences," Mar. 19, 2001, published on the internet at <http://www.microsoft.com/ PressPass/press/2001/Mar01/0.

PCT/US01/46135 International Search Report dated Jul. 9, 2002.

Allison Linn, "Microsoft Unveils.NET Strategy," The Seattle Times, Mar. 19, 2001, published on the internet at <http://dailynews.yahoo.com/h/xseap/20010319/microsoft hailstorm 1.html>.

PressPass, "Microsoft's Bill Gates Previews New 'Hailstorm' Technologies to Usher in New Era of More Consistent Personalized and User-Centric Experiences," Mar. 19, 2001, published on the internet at <http://www.microsoft.com/ PressPass/press/2001/Mar01/03-19HailstormPR.asp.>.

* cited by examiner

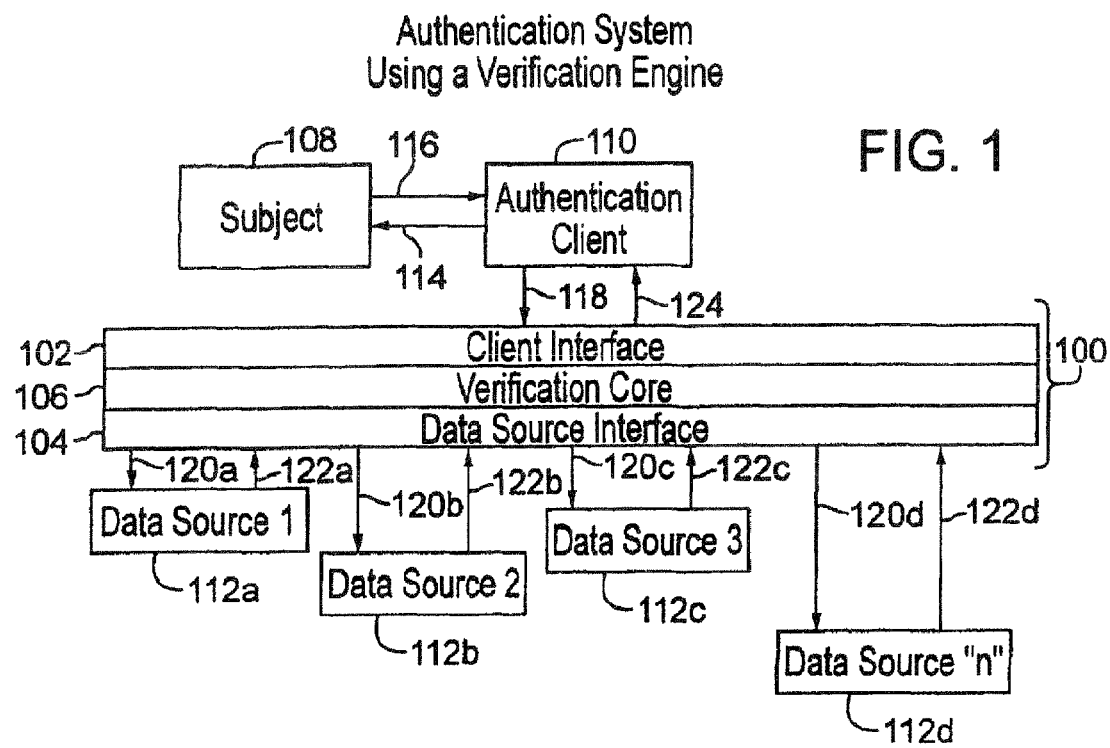
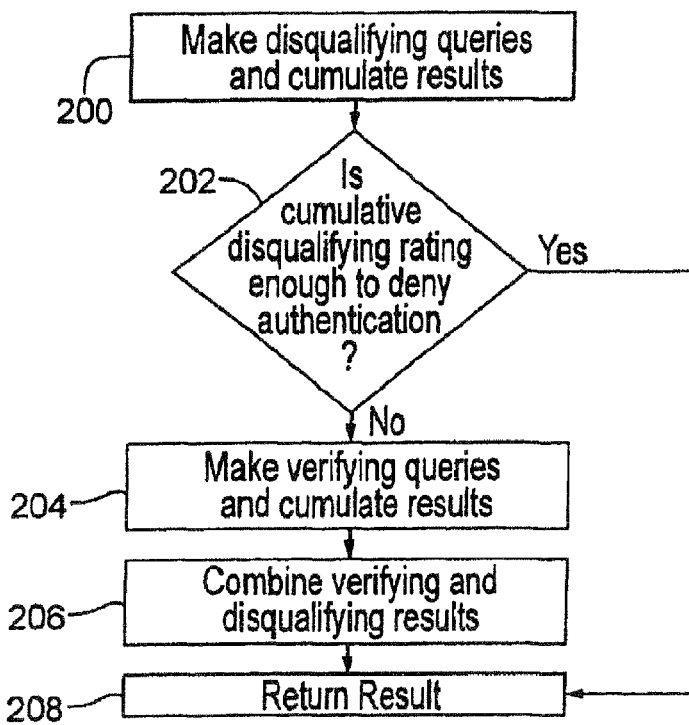

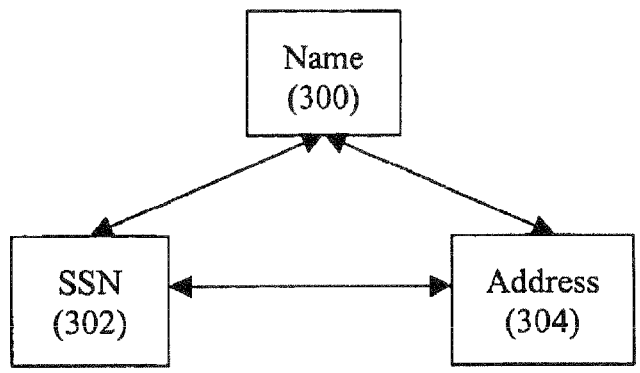
Fig. 3
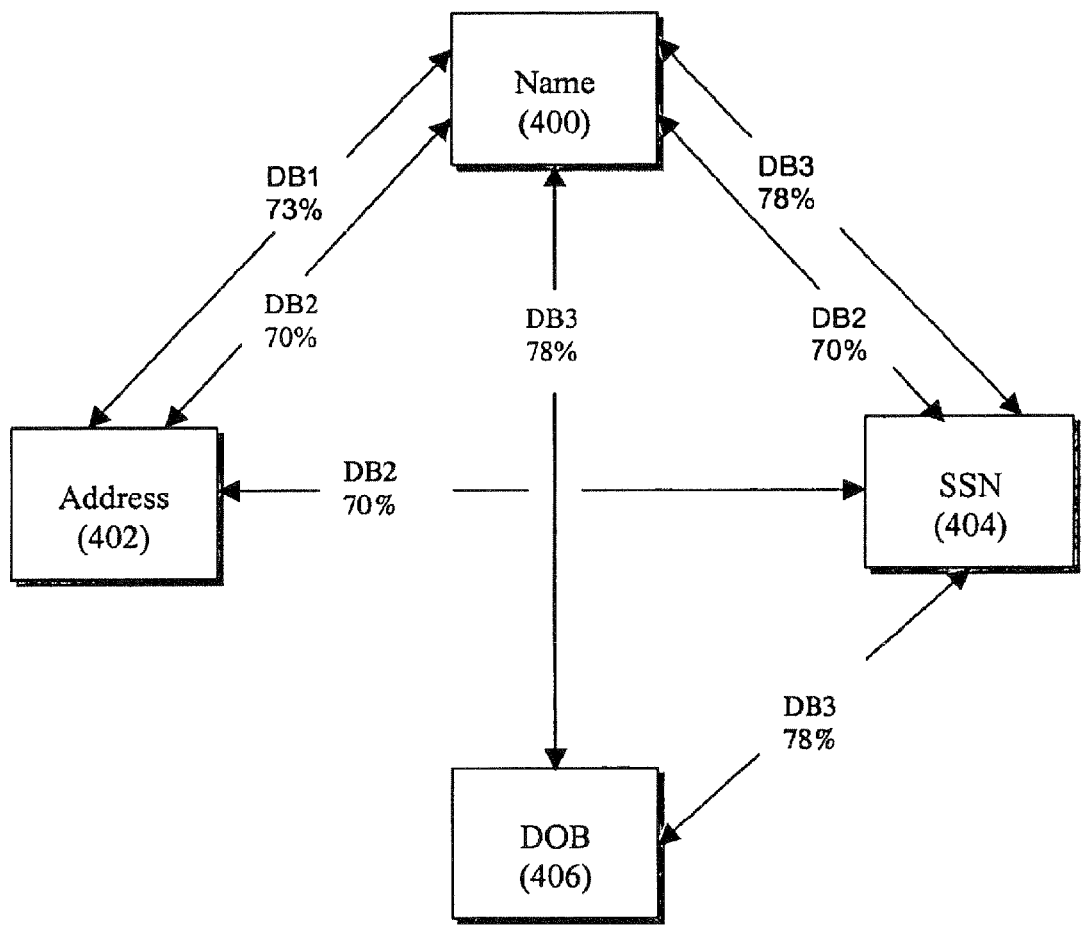
Fig. 6 (Database Responses)

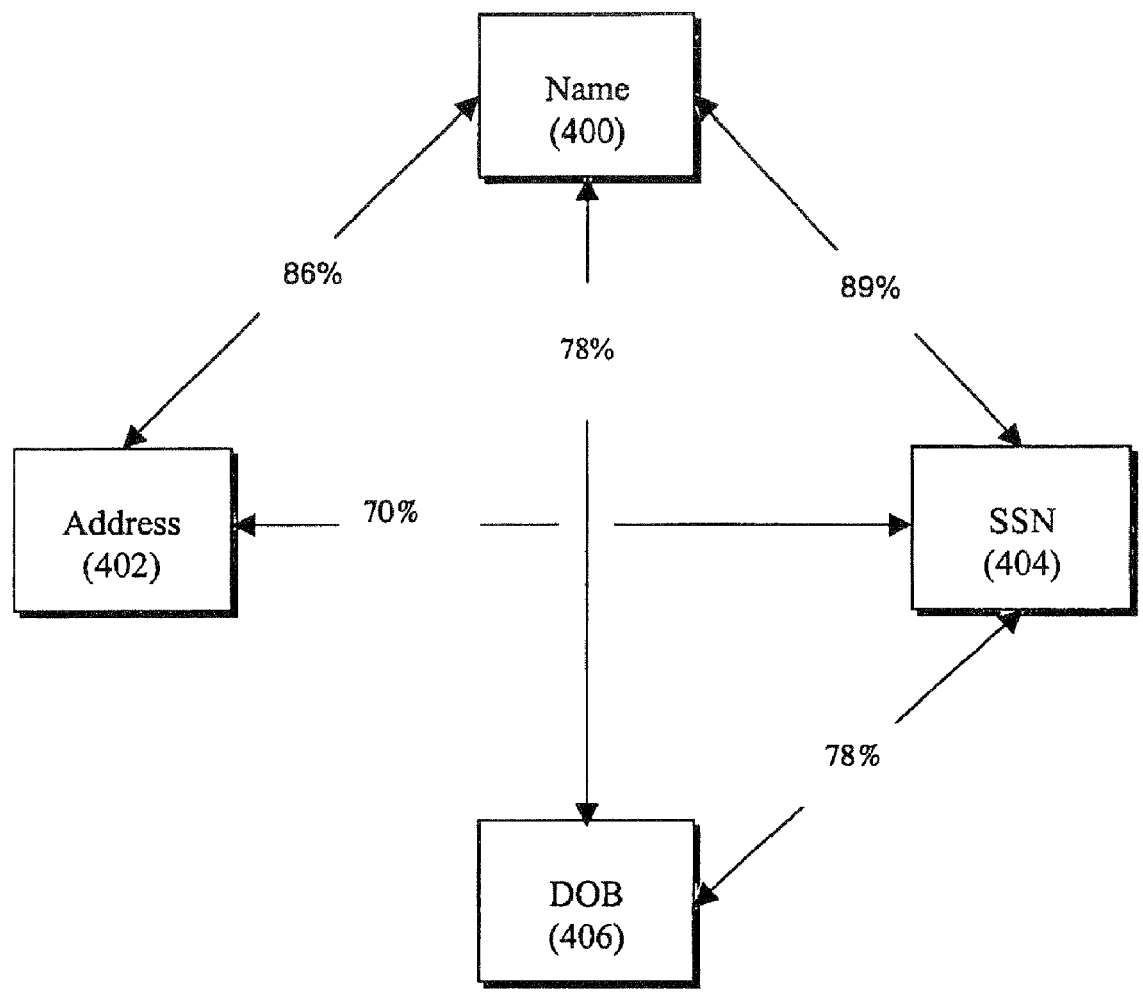
Fig. 7 (Direct Link Ratings)

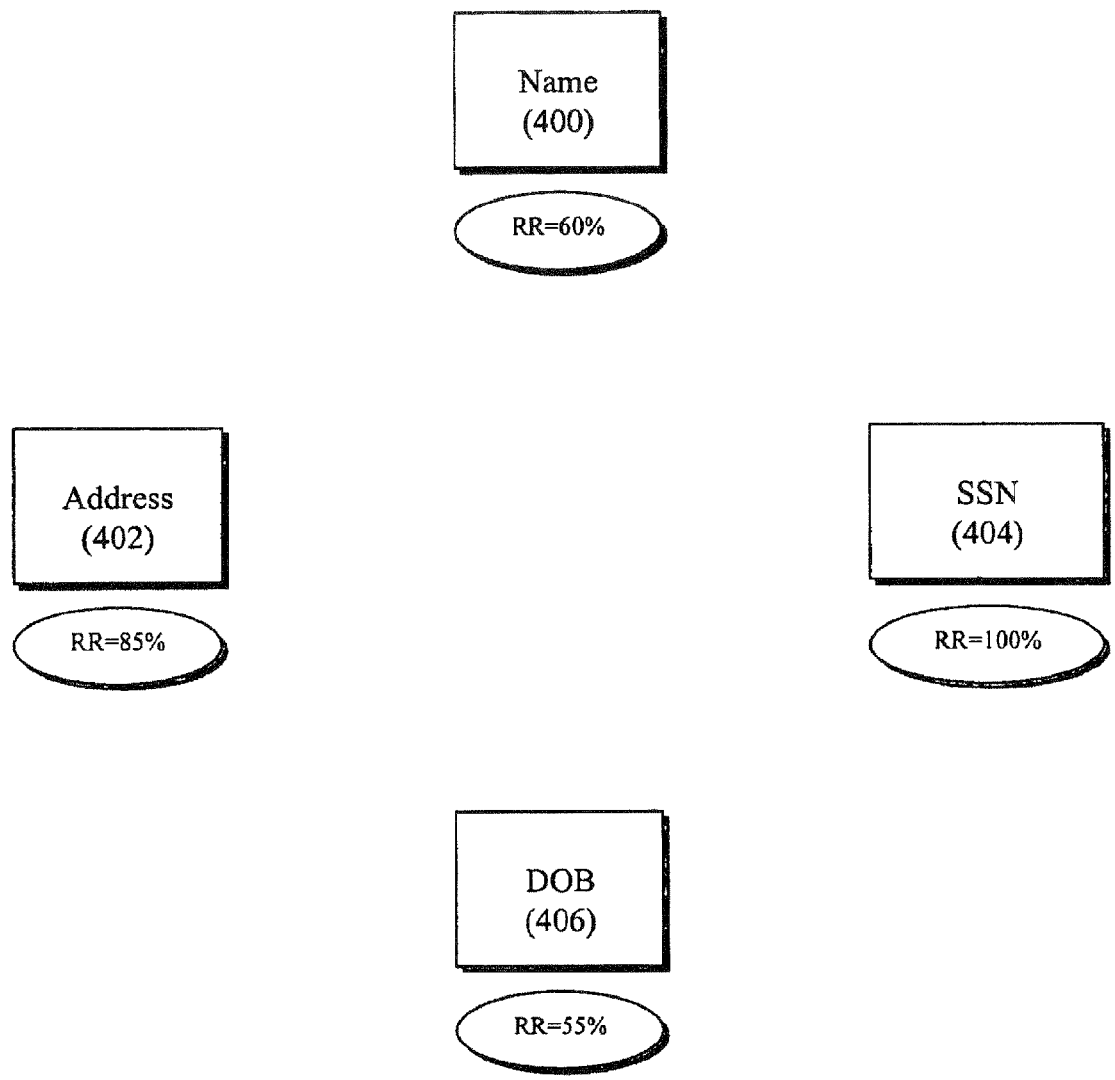
Fig. 8 (Restriction Ratings per Item)

| | | | | | |
|---|---|---|---|---|---|
| Name | < 86% > | Address | < 70% > | SSN | |
| Name | < 78% > | DOB | < 78% > | SSN | |
| | | | | | |
| Name | < 89% > | SSN | < 70% > | Address | |
| Name | < 78% > | DOB | < NULL > | Address | |
| | | | | | |
| Name | < 86% > | Address | < NULL > | DOB | |
| Name | < 89% > | SSN | < 78% > | DOB | |
| | | | | | |
| SSN | < 78% > | DOB | < NULL > | Address | |
| SSN | < 89% > | Name | < 86% > | Address | |
| | | | | | |
| SSN | < 70% > | Address | < NULL > | DOB | |
| SSN | < 89% > | Name | < 78% > | DOB | |
| | | | | | |
| Address | < 86% > | Name | < 78% > | DOB | |
| Address | < 70% > | SSN | < 78% > | DOB | |

Fig. 9

1. Name < 86% > Address < 70% > SSN
   RR=85%

2. Name < 78% > DOB < 78% > SSN
   RR=55%

3. Name < 89% > SSN < 70% > Address
4. Name < 89% > SSN < 78% > DOB
5. Address < 70% > SSN < 78% > DOB
   RR=100%

6. SSN < 89% > Name < 86% > Address
7. SSN < 89% > Name < 78% > DOB
8. Address < 86% > Name < 78% > DOB
   RR=60%

Fig. 10

1. Name     < 60.1% via Address >     SSN

2. Name     < 51.6% via DOB >     SSN

3. Name     < 65.6% via SSN >     Address

4. Name     < 71.8% via SSN >     DOB

5. Address     < 61.2% via SSN >     DOB

8. Address     < 54.0% via Name >     DOB

6. SSN     < 55.6% via Name >     Address

7. SSN     < 54.4% via Name >     DOB

Fig. 11

| | | |
|---|---|---|
| Name | < 61.6% > | SSN |
| Name | < 65.6% > | Address |
| Name | < 71.8% > | DOB |
| Address | < 64.9% > | DOB |
| SSN | < 55.6% > | Address |
| SSN | < 54.4% > | DOB |

Fig. 12A

| | | |
|---|---|---|
| Name | < 89% > | SSN |
| Name | < 86% > | Address |
| Name | < 78% > | DOB |
| Address | < 50% > | DOB |
| SSN | < 70% > | Address |
| SSN | < 78% > | DOB |

Fig. 12B

Grouping:

| | | | |
|---|---|---|---|
| Name | < 89% > | SSN | Direct |
| Name | < 61.6% > | SSN | Indirect |
| Name | < 86% > | Address | Direct |
| Name | < 65.6% > | Address | Indirect |
| Name | < 78% > | DOB | Direct |
| Name | < 71.8% > | DOB | Indirect |
| Address | < 50% > | DOB | Direct |
| Address | < 64.9% > | DOB | Indirect |
| SSN | < 70% > | Address | Direct |
| SSN | < 55.6% > | Address | Indirect |
| SSN | < 78% > | DOB | Direct |
| SSN | < 54.4% > | DOB | Indirect |

Fig. 12C

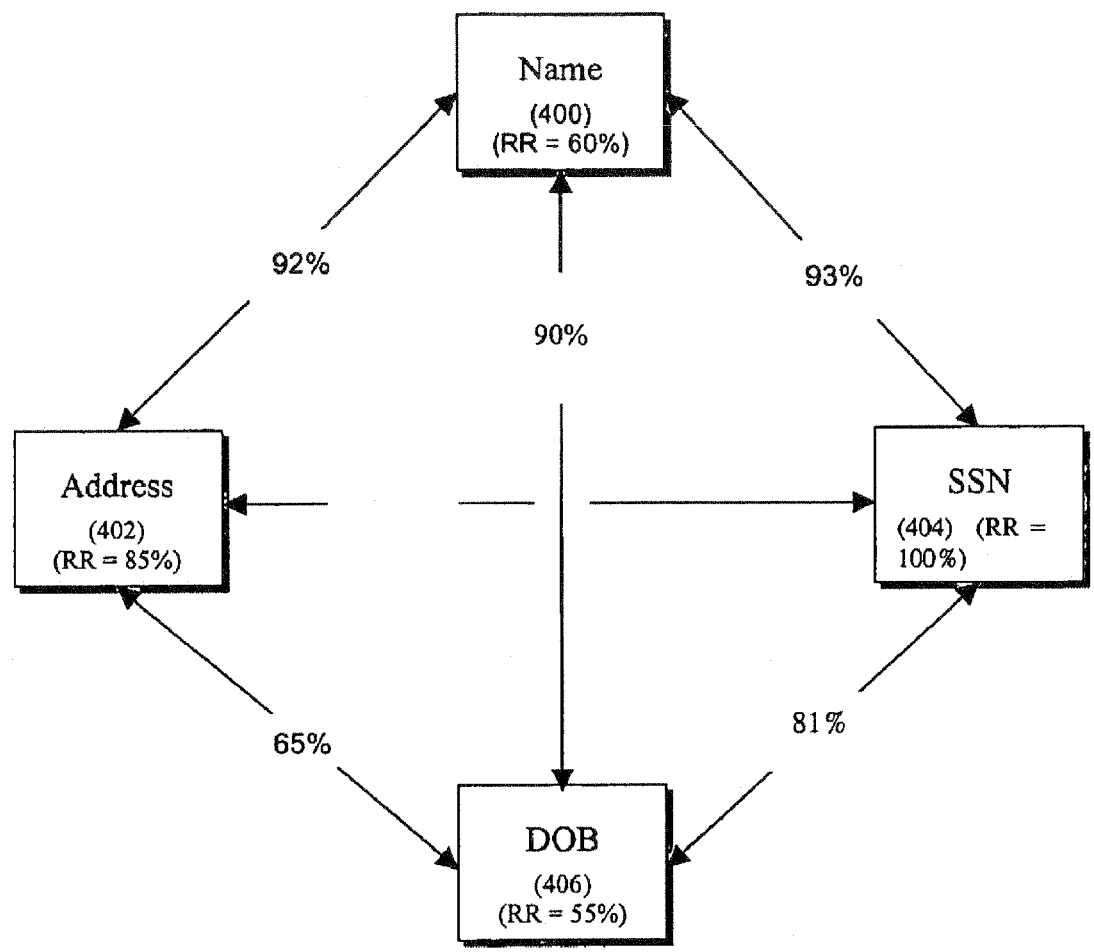
Fig. 13 (Total Link Ratings)

Fig. 14 (Required Link Ratings)

| Item | Name | Address | SSN | DOB |
|---|---|---|---|---|
| Name |  | 86% | 89% | 78% |
| Address | 86% |  | 70% | 50% |
| SSN | 89% | 70% |  | 78% |
| DOB | 78% | 50% | 78% |  |
| Per-Item | 99.4% | 93.5% | 98.5% | 92.6% |

AUTHENTICATION QUERY STRATEGIZER AND RESULTS COMPILER

RELATED APPLICATIONS

This application is a continuation of U.S. patent application Ser. No. 10/449,568 filed May 29, 2003, now U.S. Pat. No. 7,343,623, which claims priority from U.S. Provisional Patent Application No. 60/384,557, filed May 29, 2002, both of which are hereby incorporated by reference in their entirety.

TECHNICAL FIELD

The present invention relates to the field of apparatuses and procedures for identity authentication using shared information accessible via a plurality of independent data sources.

BACKGROUND OF THE INVENTION

Currently, many systems in use to provide online or in-person security often employ security measures designed to authenticate the identity of subjects that are using the system. The process of "authentication" (i.e., the establishment or verification of identity) is the process of determining that the authentication subject is who he purports to be. There are different procedures for conducting authentication, and they each afford varying degrees of security.

Traditionally, subject authentication has been conducted in one of three ways: recognition of the subject (i.e., vouching), possession of a token by the subject, and shared knowledge. For authentication based on shared knowledge, the authentication system has access to information about the subject that should not be common knowledge. When the subject also convincingly demonstrates that he knows the same information, the subject's identity can be authenticated. The authenticating information is referred to as "shared" because it is known by both the authentication system and the authentication subject; otherwise, the information is not widely known.

In prior authentication systems, the shared authenticating information is typically stored in a database that the system can access as necessary to verify information provided by the authentication subject. Typical Web site login pages often provide a common example of this. The subject must provide a username and password, which the system verifies by accessing corresponding account records stored in a database.

Unfortunately, there are several disadvantages to the authentication systems of the prior art. One problem is that they are typically dependent on a single source of information. However, there are no perfect databases. No one database contains all possible query answers. Databases must constantly be maintained to ensure that they contain the most recent information. Even with such efforts, there are frequently gaps in coverage and insufficient accuracy in the data. Therefore, no one single database includes all the information needed for reliable authentication.

Additionally, systems that rely upon information stored in a single database are susceptible to fraud. If a mal-intending individual gains access to the sole database used in an authentication process, the integrity of the entire authentication system is compromised. Secure authentication systems should be designed such that it is very difficult for the security of the system to be compromised. The information used for authentication should not all be accessible from only one source.

Authentication systems that rely on a single database for verifying authenticating information are also limited in the types of authenticating queries they can present to an authentication subject. In addition to being limited by the coverage or accuracy deficiencies of the database being used, the authentication system is also limited to presenting authentication queries that are supported by the particular indexing structure employed by the database. For example, a query cannot authenticate a username and a password unless the database includes those records, and those records are indexed so as to associate those two fields for a given individual.

What is needed is an authentication system and method that provide secure, efficient, and effective identity authentication with greater flexibility in the type and scope of authentication queries employed. The present invention fulfill this need.

SUMMARY OF THE INVENTION

Embodiments of the present invention encompass systems and methods for use in identity authentication. One illustrative application is in the context of authenticating the identity of a subject by verifying items of identifying information stored by, or accessible through, a plurality of data sources. In particular, a multi-item query can be presented to multiple data sources and the results of the query can be combined into an overall composite result that can be used to authenticate the subject's identity. The items in the query represent information provided, typically by the authentication subject himself, to purportedly establish his identity by satisfying pre-selected identification criteria. Examples of data sources include locally or remotely accessible databases, data files, web servers, APIs or other known forms of data storage or access, implemented individually or in combination with one another. Each data source's data is preferably independently generated and maintained with respect to that of each other data source. The term "independent" is used herein to signify the preferred discrete and distinct nature of the data sources used.

As used throughout this specification and the claims, the phrase "item type" refers to a defined classification for a component of an authentication query or a criterion used in the authentication process. For example, "name" and "date-of-birth" are examples of item types. The term "item" is used herein to refer to the particular data representing a given item type. For example, "John Doe" is an item of the item type "name." Additionally, as described herein, an item type included in an authentication query is referred to as a "supported item type" with respect to a given data source when that data source maintains items of that type. The term "restriction rating" refers to the measure of how nearly unique an item or item type is. As part of the authentication procedure, a restriction rating of an item can be employed when analyzing a query result.

Improved authentication of an authentication subject's purported identity can be accomplished through strategic verification of shared information dispersed among multiple data sources. The shared information used for authentication can be from multiple data sources, either locally or remotely accessible to the authentication system. While many identifying items can be verified against the shared data, the individual data can be combined so that the overall information about the user is assembled into a composite measure of how sure the system is that the subject's identity has been properly authenticated. Accordingly, varied amounts of types of information provided by the authentication subject to establish his own purported identity can be authenticated. The particular information that is required of an individual can be selected according to individual client applications or security requirements of the specific system for which authentication is being conducted. A user can be considered verified when he has supplied sufficient information to convince the system of his identity.

A first aspect of the present invention addresses the selection of a proper query to authenticate the identity of an authentication subject. The requisite processing functions and logic can be embodied in a computer-implemented verification engine operating as part of the authentication system. As can be appreciated by those of skill in the art, a verification engine can include a computer processor with memory storage and interface components sufficient for enabling communications with system users and various data sources. Thus the verification engine can be implemented in the form of processor-executable instructions stored in any non-transitory, machine-readable medium. The verification engine can employ predetermined, specific knowledge of the authentication data sources in order to select the appropriate queries based on the particular authentication requirements of the system. This knowledge includes information about how the data is made available via the data sources, what protocols or interface requirements are necessary for using or accessing the data, and what indexing or organizational structures are used by the data sources. Queries can be pre-written software components, and the verification engine can maintain and access a pool of common queries written to authenticate subjects with often-used or often-combined item types.

When querying data sources, the returned results preferably include at least two pieces of information: an authentication response including a confirmation, contradiction, or "no data" assessment, and an indication of the corresponding confidence level for that information.

Characteristics such as the percent coverage, percent accuracy, or relative importance can be ascertained for each data source. "Coverage" is defined as the number of items in the data source divided by the number of available items of that item type. "Accuracy" is defined as the estimated number of correct items in the data source divided by the total number of stored items. A data source's "importance" provides a measure of how valuable that source's responses should be considered in the authentication process. It allows for more subjective valuations and the incorporation of customer requirements or business logic into the authentication system. Characteristics such as these are preferably provided on a per-item basis for each data source. If the data sources do not already take this information into account when responding to the query, the verification engine can scale the responses accordingly. Knowing this type of information enables the verification engine to select appropriate data sources to query, select an appropriate query for the authentication required, and properly evaluate and interpret the significance of the authentication results.

Because queries can be designed to take into account the particular characteristics of each data source, queries consistent with the present invention can provide significantly more versatility and flexibility in the authentication process than those offered in the prior systems. A query can be designed or used for a variety of purposes. For example, a query can be designed for verifying purposes (seeking to establish identity of the subject) or disqualifying purposes (seeking cautionary information about the purported identity). Thus, considering the type of query and the potential authentication responses, there can be several different types of responses typically encountered. A few examples include the following: 1) verifying query verified; 2) verifying query not verified; 3) verifying query contradicted; 4) disqualifying query verified; 5) disqualifying query not verified; 6) disqualifying query contradicted. The effect that the data source's known accuracy, coverage, or importance characteristics will have on the result will vary, depending on the type of query and the type of result obtained. The verification engine can be programmed with customized logic for handling each of the various scenarios.

It is typically desired that items can be verified in pairs or larger groups. In general, authentication systems are not typically interested in whether an item is a social security number ("SSN"), but whether it is a particular person's SSN. Often, one item will need to be verified against one or more items that are not available via the same data source, or cannot be compared directly through any one data source's index structure. This can be accomplished by evaluating the confidence level or rating for the combinations of each of the items in the identification query with each other item in the query. These links are preferably pair-wise links associating two items, although there may be either direct or indirect links associating the items.

For example, consider a three-item query of name, address, and SSN. Pair-wise verification means name is verified to SSN, SSN is verified to address, and address is verified to name. The confidence level of these pair-wise links can be expressed in terms of the link's rating, which can take into account the accuracy, coverage, or other characteristics of the data source or sources by which the links are established. There are two ways to compare name with address: directly, using a data source that contains both items (with at least one of them an index for the other), or indirectly (by linking through the SSN). The overall rating of the name-to-address link can be defined as the combination of the direct and indirect links. The confidence rating of a pair-wise comparison can be defined as the aggregate of the confidence ratings of all possible paths between the two items. Successive queries can be employed until acceptable authentication or denial has been achieved. Links through multiple intermediate items can be similarly compared as part of the authentication procedure.

Pair-wise ratings reflect the confidence that both items belong to the same entity. For direct links, this can be expected because the two items were found linked together in at least one data source. For indirect links, the confidence that both items belong to the same entity can depend strongly on how nearly unique the intermediate item is. The restriction rating of the intermediary item represents this measure of uniqueness. For example, if a person has a SSN and that SSN has an associated address, the authentication system can be very confident that the person lives at that address, even if the two associations are from different (yet accurate) data sources. On the other hand, if a named person has a particular date-of-birth ("DOB") and someone with that DOB lives at a given address, the verification engine will have little confidence in associating the named person with that address. This is because date-of-birth is not a very unique item type. A high restriction rating for an item indicates confidence in linking through that item; a low restriction rating indicates a lack of confidence. The verification engine can be preprogrammed with the restriction rating for each item type that may be included in a query during authentication.

In general, if paths are in parallel (e.g., two direct paths between items), an overall pair-wise rating can be determined by aggregating the individual ratings into an overall composite rating associating the two items. If items are in a series (e.g. through multiple intermediaries), the rating for the pair can be determined by converting the ratings of each path and the restriction rating of each intermediate item into confidences. These confidences can then be combined to determine an overall confidence or rating for the pair-wise link. A query can be considered verified when all possible associations of pairs of items are verified. From the pair-wise ratings, the verification engine can determine the overall query confidence level or rating as well as the confidence level or rating for each individual item. Similarly, the verification engine can be programmed to take into account the particular business logic or customer requirements for any specific authentication client. These could include requirements as to the number of items each query must contain or the overall confidence required for a query or each individual item before a subject can be considered successfully authenticated.

Evaluating multiple paths between authentication items in a query overcomes some of the problems encountered with the prior art authentication systems. First, not all data sources contain all items or item types, so it is helpful to be able to link items from different data sources in multiple ways to establish reliable associations among items. Second, there are often gaps in coverage within a particular data source; so, it is helpful to have multiple ways to link two items within a data source. In this manner, the present authentication system can compensate for some limitations of the coverage or indexing structure in the data source being queried. Third, an additional benefit is provided in the ability to frustrate fraud while authorizing legitimate use. Having multiple sources of authenticating data makes it increasingly difficult for someone who is attempting to establish a false identity to compromise the integrity of the system. To commit successful fraud, one would have to circumvent the security of numerous authentication data sources. With a greater number of data sources available, it is difficult for one to predict which data source may be called upon to satisfy a given query, thus making it more difficult to perpetuate a fraud on the system. This is especially true for queries that are determined real-time or using randomly selected items for authentication.

Additional aspects and advantages of this invention will be apparent from the following detailed description of preferred embodiments thereof, which proceeds with reference to the accompanying drawings.

BRIEF DESCRIPTION OF THE DRAWINGS

FIG. 1 illustrates a computer-implemented authentication system consistent with the present invention.

FIG. 2 depicts a process flow diagram for generating and analyzing results from verifying and disqualifying authentication queries.

FIG. 3 conceptually illustrates a multi-item query for use in the authentication system of FIG. 1, the multi-item query including three item types.

FIG. 6 illustrates the authentication responses returned from each database of FIG. 5, for direct links of identifying items contained in the multi-item query of FIG. 4.

FIG. 7 illustrates the combined direct link ratings for the individual database responses depicted in FIG. 6.

FIG. 8 illustrates the four identification item types of the query of FIG. 4, along with their assigned restriction ratings.

FIG. 9 presents a tabular summary of the indirect links between each item of the query of FIG. 4.

FIG. 10 presents a modification of the table presented in FIG. 9, ignoring the four pair-wise paths that have a missing direct DOB to Address link, and depicting the restriction ratings (RPR) for the intermediate items FIG. 11 presents a tabular summary of the indirect link ratings for the query items of FIG. 4.

FIG. 12A depicts the tabular summary of FIG. 11 in an aggregated form after applying the Bayesian aggregation formula to the grouped path ratings.

FIG. 12B tabularizes the results of the direct pair-wise ratings illustrated in FIG. 7

FIG. 12C groups the parallel direct and indirect pats linking the query items of FIG. 4.

FIG. 13 combines the indirect and direct paths grouped in FIG. 12C, to yield composite pair-wise ratings.

FIG. 14 depicts the required items of the query of FIG. 4, along with the corresponding ranks for the pair-wise links for the required items.

DETAILED DESCRIPTION OF PREFERRED EMBODIMENTS

Figure 4:
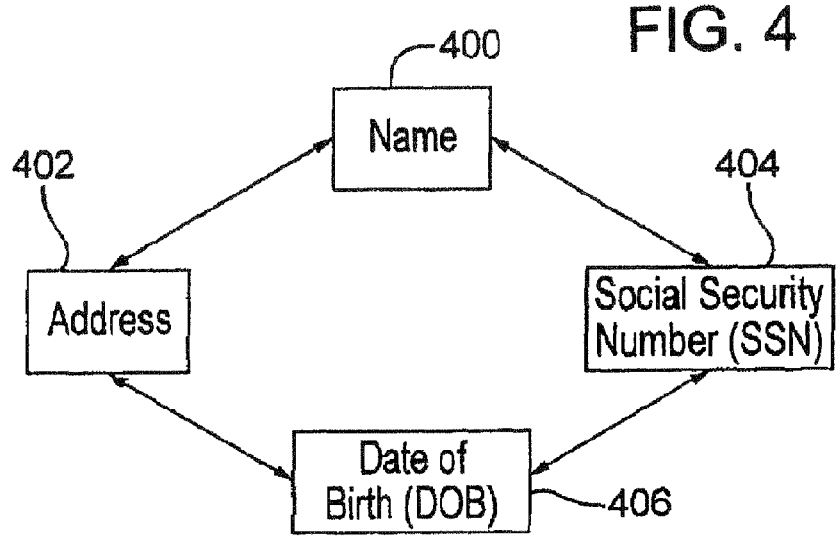
FIG. 4 illustrates an example of a four-item query for use in an authentication procedure.

The following description presents preferred embodiments of the present invention for use in conducting authentication procedures. Preferably the invention is embodied in a method and system for conducting identity authentication based on verifying information supplied to purportedly establish an identity against shared information representing that identity. Such authentication can be used, for example, to verify the identity of an individual seeking access to some restricted place or item.

A preferred embodiment of the presentation, as described herein, can be used for identity authentication in a wide variety of contexts. For example, an authentication system or method consistent with the present invention can be implemented as part of a financial authentication system, to facilitate an online transaction, to grant restricted access to social venues, to screen passengers in an airport or other common carrier terminal before granting access to the transport vehicle, to grant access to restricted or controlled substances, such as alcohol, prescription drugs, or even voting ballots, to allow remote or online authentication over the Web, PSTN, or other network, or for in-person authentication of an authentication subject present at a verification terminal that serves as the interface to the verification engine driving the system. The verification engine can be accessed to conduct authentication services upon initial registration of the system or a remote terminal, for authenticating based on newly available information, for occasional use by people who don't want to use a standard user name and password for authentication, or for an authentication service client that demands a level of confirmation that is higher than those typically achieved with prior systems. However, those skilled in the art will fully appreciate that the applicability of the present invention exceeds these illustrative descriptions.

A preferred system consistent with the present invention can be embodied in a computer-implemented authentication system such as that described in U.S. patent application Ser. No. 10/003,719, filed Oct. 30, 2001, which is hereby incorporated by reference in its entirety. A similar system is illustrated in FIG. 1. The authentication system of FIG. 1 includes a verification engine 100 to enable identity authentication according to preprogrammed business logic or specific authentication requirements required by an authentication client 110. The verification engine 100 can include various components, including a client interface 102, a database interface 104, and a verification core 106. An authentication subject 108 that requires authentication can communicate with the authentication client 110 either remotely, or in person. The authentication subject 108 can provide items of identifying information to the authentication client 110. The authentication client 110 gives and receives information to and from the verification core 106 through the client interface 102. The verification core 106 presents the items of identifying information as part of an authentication query 120*a* through 120*d* to one or more independent data sources 112*a* through 112*d*. Data source "n" 112*d* illustrates that a potentially unlimited number of data sources can be provided for authentication with the verification engine.

When the authentication subject 108 wishes to identify himself to or through the authentication client 110, the authentication client 110 can request items of identifying information 114 from the subject. The actual identifying items requested can depend on the scope of the authentication services being provided by the authentication client 110. In response 116, the subject 108 supplies data purportedly identifying himself according to the requested item types. The authentication client 110 then forwards 118 the response 116 to the verification engine 100 to authenticate the items purportedly identifying the subject 108. The verification engine 100 can verify the identity of the subject 108 by communicating a query 120*a* through 120*d* to multiple data sources 112*a* through 112*d*. The query seeks to establish authentication by verifying with acceptable levels of confidence that each identifying item supplied by the authentication subject 108 actually belong to the same individual.

Each data source 112*a* through 112*d* verifies one or more of the items, preferably in pair-wise association with each other item, against the identifying information of that item type that it stores for the putative subject 108. The data sources return an authentication result 122*a* through 122*d* can include an authentication response and a confidence indication for the response. The authentication response includes information reporting whether the query (or partial query) was confirmed, contradicted, or whether no data was available. The confidence indication qualifies or qualifies how confident the data source is in the response it provides. For example, a query result can indicate that a particular data source is ninety percent confident that a specific name and social security number belong to the same individual. The verification engine 100 combines the individual authentication results 122*a* through 122*d* into a combined confidence indication 124 that can be provided to the authentication client 110 for authenticating the subject 108.

For improved communication of queries and analysis of responses, the verification engine preferably is provided with sufficient information to weigh the significance of the data available via each data source. In a preferred embodiment, this information includes both real-time information and general characterizations of the data sources and their stored identification items. The real-time information includes the confirmation, contradiction, or lack-of-data authentication response and the attendant confidence indication for that information provided in response to an authentication query. The general characterizations include representations of the coverage, reliability, and relative importance of the identifying items from each data source. The general characterizations are preferably represented numerically, as a percentage.

For efficiency, queries are preferably pre-written code designed to verify data supplied for common item types or combinations of item types. These queries can be maintained in computer memory and made accessible to the verification engine as needed. The verification engine can select among the queries in the query pool based on the authentication required. Information known about the data sources can also be used to determine the proper selection of queries. This information can include predetermined knowledge indicating how each data source indexes its information, which data sources allow data capture for comparing items available via that data source against items available via other data sources, and which items are sufficiently restrictive (as described below) to allow cross-database querying or serving as intermediate items in a multi-item link.

The data source outputs preferably can be weighed on a per-query and per-data-source basis. A typical query may either be verifying (seeking to establish identity) or disqualifying (seeking cautionary information). Thus, there are six types of responses typically encountered: 1) a verifying query is verified; 2) a verifying query is not verified; 3) a verifying query is contradicted; 4) a disqualifying query is verified; 5) a disqualifying query is not verified; 6) a disqualifying query is contradicted. Information on the accuracy and coverage ratings of each data source can be taken into account to weigh the significance of each type of response for each type of query. In addition to, or as an alternative to, coverage and accuracy, factors such as the relative importance of the data source or a particular item from the query can provide further qualification on the significance of the data source's query responses. These qualifications can be subjectively or objectively determined for each data source or identification item depending on the particular implementation. When considering relative importance of data sources or an item, a preferred embodiment adopts an importance rating that would narrow the range of possible confidence levels or confidence ratings from both ends. For example, in a system where confidence indications range from 0% for complete confidence in a disqualifying query response, to 100% for perfect confidence in a verifying query response, a completely unimportant database can be determined to return a 50% confidence level all the time (i.e., no confidence). Narrowing from both ends of the scale allows flexibility and customization in the way the authentication system is set up and operated. Rather than running from 0% to 100%, query response ratings for a particular data source may range from 10% to 90%, etc. The confidence levels are preferably narrowed at both ends in order to preserve 50% as an indicator of "no information." This also helps preserve the mathematical relationships described herein.

By employing authentication queries that are written, selected, and communicated by a verification engine with knowledge of the advantages and limitations of the identifying items available via each data source, the authentication system affords increased versatility and flexibility over prior art systems. For example, a preferred authentication system consistent with the present invention can use negative data sources (such as financial databases that track information identifying individuals who are credit risks or who have a history of writing bad checks). While a subject's presence in a negative data source can be used to obtain disqualifying information if the purpose of the data source is relevant to the reason for which authentication is sought (e.g., a negative credit risk data source being consulted while authenticating a subject's identity for an online credit card application), for unrelated transactions a negative data source can also be used exactly like any other data source: to confirm the subject's identity.

Because embodiments of the present invention are provided to authenticate a subject through the use of shared information, and each item of the shared information can come from different data sources, the identifying items provided by the authentication subject are first combined for inclusion in an authentication query. The composite information representing the authentication subject can then be analyzed to develop a representation of how confident the system is in the authentication subject's identity. Queries can consist of items found in a single data source or in multiple data sources. The verification engine can automatically determine the data source(s) to query depending on the identifying items to be established by the authentication subject. Because, as a general rule, having more information allows for better authentication results, multi-item queries are preferred. Also, it is preferred to ask the authentication subject to supply more items than the authentication system may typically require for a successful authentication. This affords a greater likelihood of confirming a query, especially when data source coverage is imperfect.

FIG. 2 presents one illustrative example of an authentication process consistent with the present invention. As will be readily apparent to those skilled in the art, the order of the steps can be altered while remaining consistent with the underlying invention. At step 200, disqualifying queries are made, and the results are cumulated. At 202, a determination is made as to whether the cumulative disqualifying rating is enough to deny authentication. If so, that result is retuned at 208. If not, at step 204, verifying queries are made and the results are separately combined. The verifying and disqualifying queries are then combined to determine a composite result in step 206. That result is then returned at step 208.

FIG. 3 depicts an example of a multi-item query comprising three identification item types: name 300, social security number (SSN) 302, and address 304. As part of the authentication procedure, the authentication subject can be asked to provide identification items purportedly establishing his identity according to each of the item types. The query would then be communicated to the appropriate data sources with the identifying items supplied by the authentication subject. The supplied items can be verified against a data source's stored data representing the purported identity.

If multiple data sources provide items of the type or types being queried, the verification engine of the authentication system can communicate the query to any or all of them. If there are multiple results from the query (each providing an authentication response and an associated confidence indication for identifying item or items), the various results can be aggregated into a composite result. A preferred embodiment of the present invention uses the Bayesian aggregation formula (derived from Bayes's Theorem) to combine the results from each data source for the item or items queried.

Implementing the Bayesian method for aggregating confidence ratings yields the following result: $(r_c)/(100\%-r_c) = \Pi_i * [(r_i)/(100\%-r_i)]$, where $r_i$ are scaled ratings for each data source, $r_c$ is the combined rating, and the symbol $\Pi_i$ signifies the product over all $r_i$ values.

Implementation of the Bayesian aggregation formula in an authentication system exhibits the characteristic that, with no knowledge of whether a query should or should not be confirmed, the a priori rating of a query can be set at 50%. The system can also handle both positive and negative databases and both verifying and disqualifying information. Responses can be scaled from 0% to 100%, where 0% is absolutely known negative information (i.e., 100% confidence in a disqualifying query response), 50% is complete ignorance, and 100% is absolutely known positive information (i.e., 100% confidence in a verifying query response). Aggregating results allows for cumulating of positive and negative data toward more certain authentication and denial, respectively.

The Bayesian formula can be implemented because it yields a simple mathematical formula with certain beneficial characteristics. These include the following: it ensures a value of 50% (which provides no data) does not change other evidence; it allows for ratings to be limited to the 0% to 100% range for multiple combined ratings (assuming each individual rating has the same range); it forces positive certainty to prevail in authentication over partial data, and it forces negative certainty to win over partial data; it allows positive ratings to yield an overall rating higher than any individual rating; and it allows multiple negative ratings to yield an overall rating lower than any individual rating. Those skilled in the mathematical arts will realize that alternative mathematical expressions may be desirable if different characteristics would be advantageous.

The overall confidence indication returned by the verification engine for single-item queries is the Bayesian aggregation of the results returned by the individual databases. However, because the goal of authentication is typically to verify a sufficient number of items to increase reliability and accuracy, while decreasing the potential for fraud, using multi-item queries are preferred.

For multiple item queries, the rating or confidence indication expresses how sure the system is that the query combination matches a unique individual, presumed to be the authentication subject. A query is considered verified when all possible associations of pairs of items are verified. This pair-wise confirmation makes the calculation of per-item and overall query confidence ratings straightforward. From the pair-wise ratings, information such as the overall query confidence rating and individual item rating can be determined, depending on the requirements of the authentication system.

With reference to FIG. 3, pair-wise verification indicates that the "name" item 300 is verified with the "SSN" item 302, the "SSN" item 302 is verified with the "address" item 304, and the "address" item 304 is verified with the "name" item 300. Note that there are two ways to compare items, such as name 300 with address 304. It can be done directly, using a database that contains both items (with at least one of them an index for the other), or they can be compared with a link established through the SSN. The overall rating of the name and address link can be defined as the Bayesian combination of the direct and indirect links. The Bayesian combination works because each method of confirming the pair adds independent information. Generally stated, the confidence rating of a pair-wise comparison is the Bayesian aggregate of the confidence ratings of all possible paths between the two items.

With the query of FIG. 3, there are only two possible paths linking name and address—the direct one, and the one that passes through the SSN. If four-item queries were presented, there would, of course, be more paths. For example, for queries containing 2, 3, 4, 5, 6, and 7 items, there would be 1, 2, 5, 16, 65, and 326 paths between any two items in the query. For efficiency and cost reasons, it may not be advisable to determine the ratings for each path. Depending on the data sources used (i.e., depending on their coverage, indexing, and whether they allow data capture for comparison of items against items at other data sources) it may not be possible to construct a link for every mathematically possible path.

Because the preferred embodiment of the present invention adopts the Bayesian aggregation for combing the confidence indications of the various links between identification items in a query, the confidence indications are typically converted to ratings for aggregation procedures. As used in a preferred embodiment, the term "confidence" or "confidence level" is typically used as an indicator of how sure the data source, authentication system, is in the query result. Confidence levels preferably range from 0% for no confidence, to 100% for complete confidence. However, these values may also be scaled based on practical considerations or limitations for given implementations of the authentication system.

Also, in a preferred embodiment, the term "rating" refers to a confidence indication that has been scaled for a particular application of the authentication system. Preferably, the rating scale can include both verifying and disqualifying query responses on a single, positive composite scale of 0% to 100%. Because both verifying and disqualifying queries can be used, and positive and negative data sources can provide information, the rating scale is preferably established to handle the entire range of possible values within this positive number range. This is consistent with the mathematical relationships described herein. Ratings are preferably scaled such that 0% indicates complete confidence (e.g., 100% confidence) in contradictory information or a disqualifying result from the data source, 50% indicates no information, and 100% indicates complete confidence (e.g., 100%) in a verifying query result. To keep the two concepts distinct, the result a data source returns is typically referred to by the term "confidence level," while the result of aggregate scaling is referred to as the "rating" or "confidence rating." Essentially, ratings take into account both positive and negative information, and represent it on a positive number scale. While the particular confidence and rating scales of the preferred embodiment of the invention are disclosed in context of these preferred numeric ranges, those skilled in the art will fully appreciate that additional or alternative embodiments may be employed to indicate authentication confidence levels consistent with the present invention. These modifications are also within the scope of the present invention, and the term "confidence indication" is issued herein to signify a more generic form of indicating how sure the authentication system can be of a particular result, independent of any particular numeric range.

A multi-item authentication query can be considered verified when each pair of items is verified. Therefore, it is preferred that at least one member of the verification pair is an index item (i.e., indexed to the other item, or to an intermediary that is an index item to the other of the pair). To apply the Bayesian formula, the rating for each possible path is calculated. Because many data sources have accuracy, coverage, and other imperfections, a preferred embodiment can continue to query new data sources (or the same data sources with new identification items) until the cumulative rating reaches some predetermined threshold (e.g., greater than 90% or less than 10%).

While the rating for a direct link between two items can be determine in a fairly straight forward manner, the rating for an indirect link can be somewhat more complex. Indirect links comprise chains linking a pair of items through one more intermediate item. To successfully verify a chain of items, it is preferred that each item in the link is indexed by at least one other item in the link, and each intermediate item should be sufficiently restrictive to allow for a reliable link. Whenever items in a link come from more than one data source, at least one data source preferably allows for data capture to associate the disparate items during the authentication procedure.

The term "restriction rating" describes the measure of how nearly unique an item is. Restriction ratings preferably run from 50% to 100%. A 50% restriction rating means the item applies equally well to everyone. A 100% restriction rating means the item applies to only a single individual. For example, SSN, driver's license number (DLN), financial account, address, and telephone number are all fairly restrictive. Name and date of birth, however, are not very restrictive. Restriction ratings can be used for creating links between pairs of item (or among groups of items), to ensure the system is evaluating the same purported authentication subject with each identifying item verified.

If an indirect link is confirmed through two items at the same time (e.g. SSN to name and address to DLN), the rating is just the Bayesian aggregation of the ratings for SSN to name to DLN, and SSN to address to DLN. Thus, for consistency, we define the restriction rating for multiple items as the Bayesian aggregation of each item's restriction rating.

Additional procedures can be adopted to further optimize the authentication system. For example, requirements can be established as to the number of items that must be in a query, the overall query rating required, whether the confidence in individual items must also be independently rated, etc. If all items in the query are required, the overall confidence rating can be defined as the rating of the worst pair-wise link. In other words, the verification of an overall query can be upwardly limited by the verification of its worst link. If some items are optional (e.g. a five-item query with confirmation of four items required for verification), starting with the worst rated non-required item, items (and their links) can be removed until the required number of items are left. The worst remaining link confidence rating can be defined as the overall query rating. This method of combining ratings has a good side effect. With a five-item query, for example, where all five items are required, the system can determine that any later query (on the same individual, with the same data sources) of a subset of those five items would be confirmed with equal or greater confidence. Because this is known, the additional queries do not have to be implemented, saving cost and time.

It is preferred to analyze multiple paths between linked items, because not all databases contain all items, so it is necessary to link items in different databases multiple ways in order to connect them reliably. Additionally, there are sometimes gaps in coverage within a particular database, so it is good to have many ways to link two query items.

In general, if paths are in parallel, the overall rating can be the combination of their individual ratings using the Bayesian aggregation formula. If items are in a series (e.g. through multiple intermediaries), the overall rating is preferably calculated for the pair by converting the ratings of each path and the restriction rating of each intermediate item into confidences, multiplying the confidences together, and converting the result back into a rating. Also, calculations such as the measures of fuzziness (e.g. how close is "James" to "Jim," or "Oak Grove Court" to "Oak Grove Circle", etc.).

Detailed Example of an Authentication Procedure and Analysis

As stated earlier, the authentication system can be specifically tailored to operate under specific assumptions or authentication requirements, depending on the actual implementation in which it is being used. Generally speaking, customer requirements for the required identifying items, item ratings, overall ratings, etc. are completely flexible, and the techniques described in herein apply equally to the varied applications. For example, the following authentication example presumes an authentication system where customer requirements stipulate that certain item types should be queried, and that ratings should be determined for each item in the query. The verification engine submits a multi-item query to multiple databases, receives responses from those databases, and produces confidence ratings for each item and an overall rating for the query.

Figure 5:
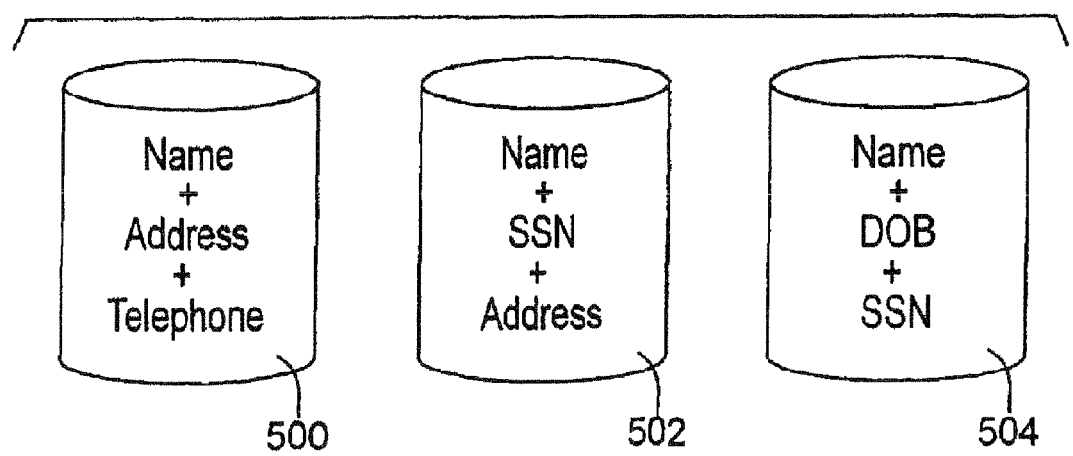
FIG. 5 illustrates three sample data sources, illustrated as independent databases, as well as the item types for the various identification items they store.

FIG. 4 depicts an example query comprising the following four item types: Name 400, Address 402, Social Security Number (SSN) 404, and Date of Birth (DOB) 406. For analysis purposes, it is also assumed that the customer stipulates that the first three items are required, and that responses are required from three total items. The customer also requires 90% confidence for each required item and 70% for the overall query. Three data sources are posited. For simplicity sake, these data sources are embodied as common databases. These databases are depicted in FIG. 5. The first database 500 offers Name+Address+Telephone. The second database 502 offers Name+SSN+Address, and the third database 504 offers Name+SSN+DOB. No database contains all four items. Therefore, the verification engine must query a plurality of the databases to satisfy the authentication requirements.

Given these customer requirements, the goal is to authenticate the identity of an authentication subject supplying identifying items purportedly establishing his identity to the authentication system, by calculating the overall query rating and individual rating for each item. This can be accomplished by first calculating the rating for each link between item pairs. These links can be direct or indirect. A direct link exists when a data source contains two items linked with some confidence. An indirect link exists when two items are linked through some intermediate item. In response to the query of FIG. 4, the databases of FIG. 5 return the following authentication responses: 1) database 500 ("DB1"): Name+Address with a 73% rating; 2) database 502 ("DB2"): Name+SSN+Address with a rating of 70%; and database 504 ("DB3"): Name+SSN+DOB with a 78% rating. This example will show how these results are combined according to the customer requirements to get individual item ratings and an overall rating for the query. It is assumed that there is no further information available from the databases. In particular, although it may be desirable to have a data source queried with items A, B, and C, return ratings for A+B+C, A+B, A+C, and B+C, it is presently assumed that neither database 502 or database 504 provides this breakdown. If the breakdown was supplied, the pair-wise ratings could be applied directly.

The first step in processing these results is to determine the pair-wise ratings for each pair of items from each data source. The result from data source 500 is straightforward. It returns a response of 73% for Name+Address. For the remaining data sources, a conservative assumption is made that no pair-wise rating (if such were available) would exceed the reported rating for the group. Thus, all pairs of items are linked with a rating of 70% for data source 502, and 78% for data source 504. The responses from all three data sources are illustrated in FIG. 6. In FIG. 6, each link is labeled with its corresponding response, as well as the database that returned the response. Note that there is no link between Address and DOB because no database of FIG. 5 contains both Address and DOB item types.

The next step is to combine the ratings for each link that has a rating from more than one database. Those ratings are combined using the Bayesian aggregation formula. The Bayesian aggregation formula assumes that the databases supplying the ratings that are being combined are independent. If the databases were actually completely dependent (e.g., if one were derived directly from the other), the combined rating would just be the better rating of the two. The results of the combined direct link ratings are illustrated in FIG. 7. For pairs with only a single database response, the rating in FIG. 7 appears unchanged with respect to the rating illustrated in FIG. 6. For links with responses from more than one database, the responses are combined using the Bayesian aggregation formula: $Q=R1*R2/(1-R1)(1-R2)$ where R1 and R2 are the ratings of responses from two different databases to the same query. The combined rating is calculated as follows: Combined Rating=$Q/(1+Q)$. This finishes the calculation of direct links. To complete the pair-wise ratings calculations, indirect ratings must also be calculated for each pair.

Calculating the indirect ratings requires knowing or assigning restriction ratings for each item type (or at least for those used as intermediaries in multi-item links). For the present example, the following restriction ratings are assigned for each item type: 100% for SSN, 85% for Address, 60% for Name, and 55% for Date of Birth. These values can be somewhat subjectively assigned to indicate the relative uniqueness of each item type. FIG. 8 illustrates the four identification item types of the query along with their assigned restriction ratings. For indirect links, the confidence that both items belong to the same entity depends strongly on the restrictiveness of the intermediate item. Individual links are calculated from the restriction rating of the intermediate item and the ratings of the links between both members of the pair and the intermediate item. If either link has no rating, it can be set to 50%, which gives the indirect link a rating of 50% as well.

FIG. 9 presents a tabular summary of the indirect links between each item. The two extreme items are linked through the one between them. NULL signifies no link exists given the databases of FIG. 5. FIG. 10 revises the tabular summary of FIG. 9 by ignoring the four pair-wise paths that have a missing direct DOB to Address link (because their 50% rating will make no difference in the later calculations). FIG. 10 also illustrates the restriction ratings (RR) for the intermediate items.

The rating for each path can then be converted into confidence values "C" (again assuming customer requirements stipulate scaling where ratings range from 0% for complete confidence in a disqualifying query response, to 100% for complete confidence in a verifying query response). Assuming a generic pair-wise link between items A and C, through intermediate item B, the following formulas can be applied: $C_{AB}=2*(R_{AB}-50\%)$, for the link between A and B; $C_{BC}=2*(R_{BC}-50\%)$, for the link between B and C; and $RC=2*(RR-50\%)$ for the restriction rating. The confidence level for the full path can be calculated as the product of these three confidences: $C_{AC}=C_{AB}*RC*C_{BC}$. The composite confidence level can then be converted back to a rating (to satisfy the example customer requirements) via the following formula: $R_{AC}=50\%+\frac{1}{2}*C_{AC}$.

FIG. 11 presents a tabular summary of the indirect link ratings calculated by the preceeding formulas. In FIG. 11, parallel indirect paths between the same item pairs are grouped together. Applying the Bayesian aggregation formula to the grouped paths condenses the tabular summary of FIG. 11 to that depicted in FIG. 12A. FIG. 12B tabularizes the results of the direct pair-wise ratings illustrated in FIG. 7 (with a rating of 50% applied for the Address to Date of Birth link, which no database supported). Parallel indirect and direct paths are depicted as grouped in the table of FIG. 12C. The ratings of the indirect and direct paths grouped in FIG. 12C can then be combined using the Bayesian aggregation formula to yield composite pair-wise ratings shown in FIG. 13. To satisfy the particular customer requirements of the present example, the authentication system can use this information to calculate the overall rating for the query and the individual item ratings for each item in the query.

With respect to overall ratings for authentication queries, there are two primary cases. First, all identification items in the query may be required for successful authentication. Second, more items may be queried than are actually required. If all items in the query are required, the overall confidence rating can be assigned the rating of the worst pair-wise link. In other words, the verification of an overall query is no better than the verification of its worst link. If some items are optional (e.g. a five-item query with confirmation of four items required for verification), starting with the worst rated non-required item, items can be removed (along with their links) until just the required number of items are left. The worst remaining link rating can then be adopted as the overall query rating.

The present example's customer requirements indicate that Name, Address, and SSN are required items. Date of Birth is not required for a successful authentication. To get the overall rating, optional items can be removed, preferably starting with the one possessing the lowest rating, until only the required items (or number of items) are left. In the present application, DOB can be removed. The resulting relationship is depicted in FIG. 14. The lowest remaining link is the 75% link between Address and SSN. This lowest remaining link can be assigned as the rating for the overall query. This conservatively ensures that the overall rating for the query is no stronger than the weakest link among the necessary authentication items.

It now only remains to calculate the individual item ratings. An individual item rating is just the Bayesian aggregation of all the ratings for links containing that item. In other words, the per-item rating measures how well the particular item fits with the rest of the query. For a given item, the rating of each link containing it is considered independent, because each link supplies different information about the item. Therefore they can be combined using the Bayesian formula.

Figure 15:
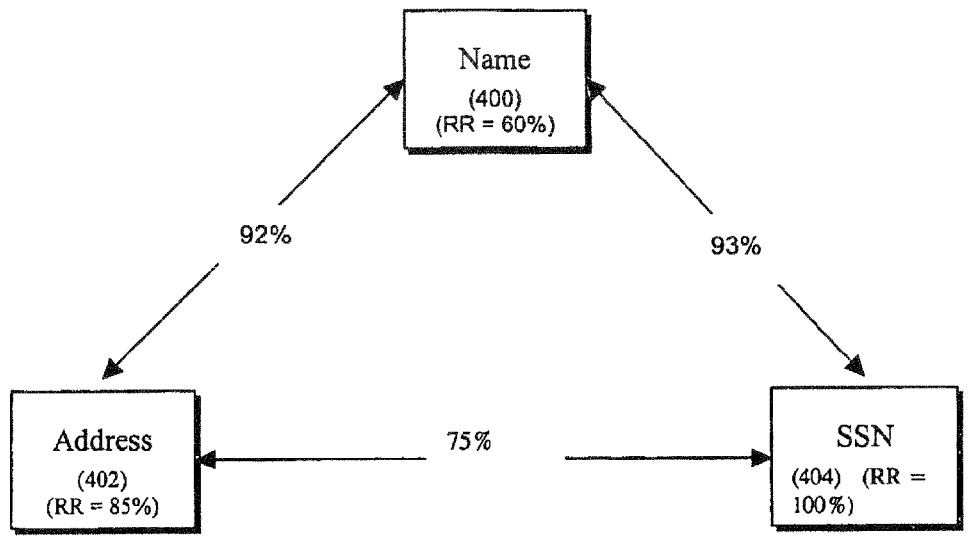
FIG. 15 illustrates in tabular form the individual confidence ratings for each item in the query of FIG. 4.

Although many applications of an authentication system consistent with the present invention would not require individual item ratings, they are being calculated as a customer requirement in the present example for illustrative purposes. In the absence of single-item queries, the evidence for an item's legitimacy consists of how well it is associated with other items in the various databases. This value can be determined by the Bayesian combination of all the direct links that the item has with other items. Preferably, only direct links are used because they contain the association information from the various data sources. An indirect link does not directly associate the item with another, so to be conservative, it is preferably ignored. The result is the table depicted in FIG. 15. In FIG. 15, the ratings in the appropriate column for each item are combined to get the per-item rating shown in the last row. The overall query rating and individual item ratings can then be compared to the customer's particular authentication threshold requirements to determine if the authentication result was sufficiently satisfactory to verify the identity of the authentication subject.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A computer program product comprising processor-executable instructions stored in a non-transitory machine-readable medium for use in automating verification of a purported identity of an individual authentication subject, the executable instructions comprising:
   (a) a user interface for receiving a plurality of identifying items representing the purported identity of the subject;
   (b) a linking component that, for each received identification item, identifies a pair-wise link to each other identification item;
   (c) a data source interface component for querying a plurality of separate, independent data sources to obtain a response from each of them, wherein the query to each data source presents a corresponding linked pair of the identifying items for verification;
   (d) the data source interface component further arranged to receive in response from each data source a respective confidence level corresponding to each pair-wise association among the identifying items; and
   (e) a results compiler for combining the received confidence levels into an overall authentication result regarding the purported identity of the individual authentication subject.

2. The computer program product of claim 1 wherein the data source interface component has access to characterization information for each data source, and the data source interface component selectively presents the queries to one or more of the data sources depending on the characterization information for each data source and the item type for each of the identifying items.

3. The computer program product of claim 2 wherein the identifying items include Name, Social Security Number (SSN), Address, and Date of Birth (DOB).

4. The computer program product of claim 3 wherein the characterization information for each data source includes at least one of content, indexing, accuracy, and coverage.

5. The computer program product of claim 3 wherein the characterization information for each data source includes at least one of content, importance, and restriction ratings.

* * * * *